United States Patent [19]

Dunsmore

[11] Patent Number: 4,861,211
[45] Date of Patent: Aug. 29, 1989

[54] COMPOSITE RIVET

[75] Inventor: Richard F. Dunsmore, Simi Valley, Calif.

[73] Assignee: Lockheed Corporation, Calabasas, Calif.

[21] Appl. No.: 189,261

[22] Filed: Oct. 17, 1988

[51] Int. Cl.[4] ............................................. F16B 19/08
[52] U.S. Cl. .................................... 411/501; 411/36; 411/361; 411/901; 411/908
[58] Field of Search ........................ 411/21–23, 411/34, 36, 361, 377, 501, 503, 506, 507, 900, 901, 904, 907, 908

[56] References Cited

U.S. PATENT DOCUMENTS

| | | | |
|---|---|---|---|
| 2,685,813 | 8/1954 | Lampman et al. | 411/506 X |
| 3,859,409 | 1/1975 | Coonrod | 264/137 X |
| 4,126,076 | 11/1978 | Rosman | 411/507 |
| 4,478,543 | 10/1984 | Lyon | 411/34 |
| 4,478,544 | 10/1984 | Strand | 411/34 |
| 4,659,268 | 4/1987 | Del Mundo et al. | 411/34 |
| 4,687,395 | 8/1987 | Berecz | 411/361 |
| 4,687,396 | 8/1987 | Berecz | 411/503 |
| 4,687,397 | 8/1987 | Berecz | 411/503 |
| 4,687,398 | 8/1987 | Berecz | 411/503 |
| 4,717,302 | 1/1988 | Adams et al. | 411/378 |

*Primary Examiner*—Gary L. Smith
*Assistant Examiner*—Douglas E. Ringel
*Attorney, Agent, or Firm*—Louis L. Dachs

[57] ABSTRACT

The invention is a composite rivet comprising a tubular preform having a longitudinal axis and an aperture therethrough aligned with the longitudinal axis. The preform further comprises a head portion, a head forming portion and a shear portion therebetween. The preform is composed of filamentary material in a resin matrix with the filamentary material in the head forming portion in a helical pattern about the longitudinal axis. A mandrel is mounted in the aperture with the mandrel having an end extending outward from said head forming portion.

6 Claims, 2 Drawing Sheets

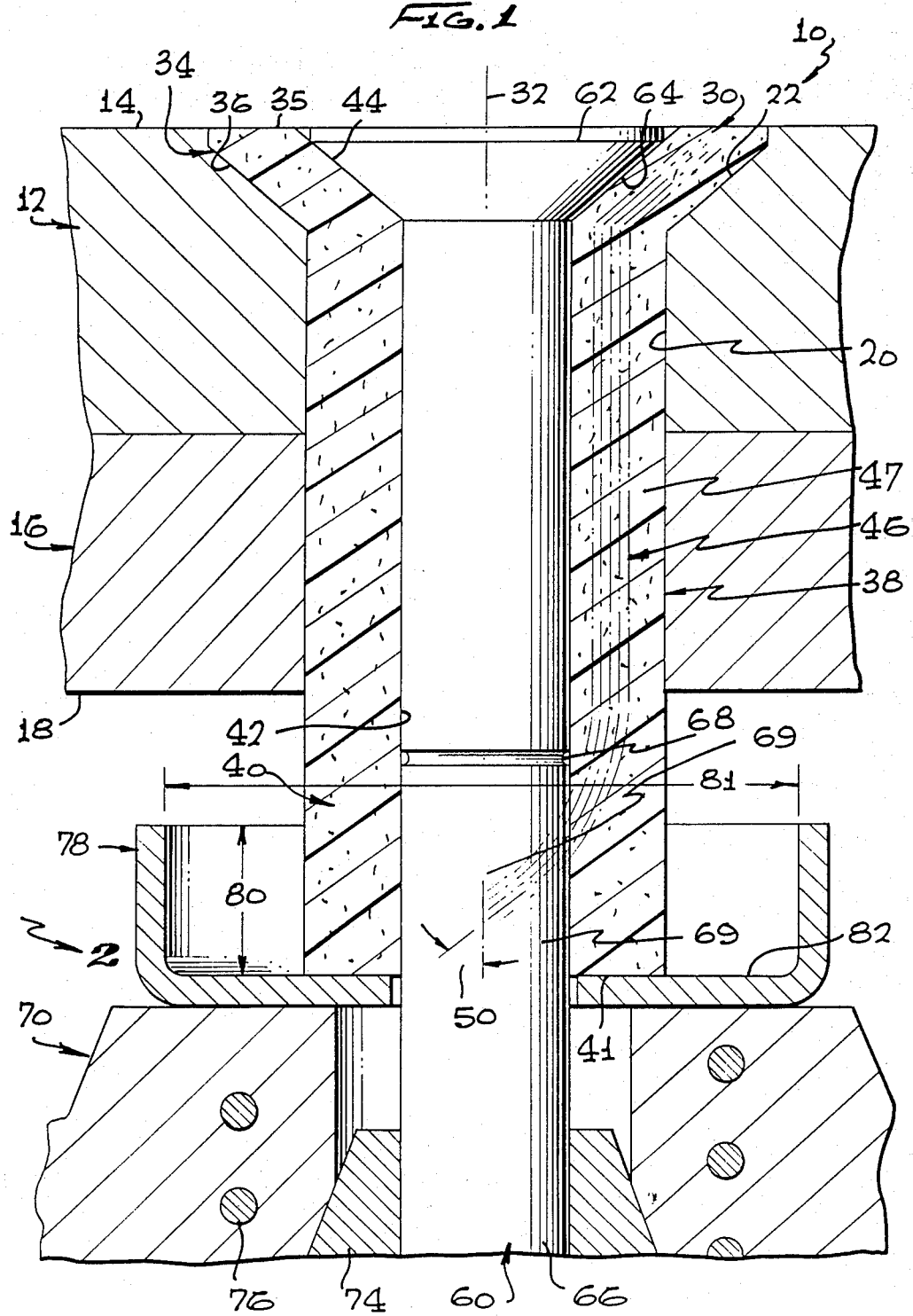

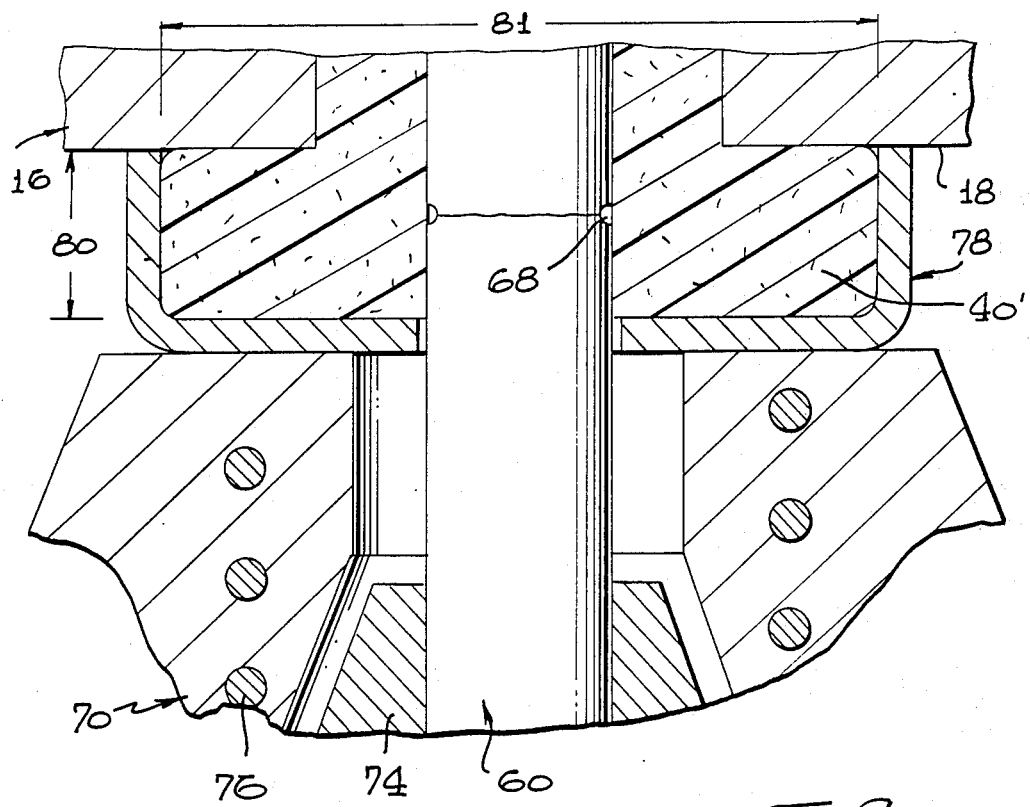
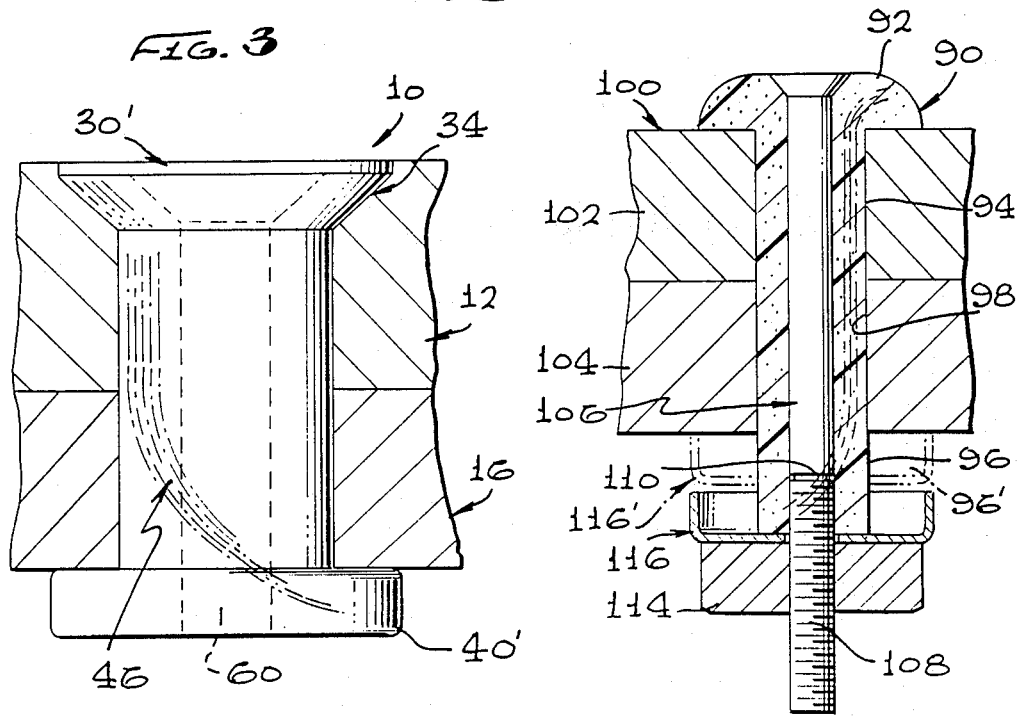

4,861,211

COMPOSITE RIVET

TECHNICAL FIELD

The invention relates to the field of fasteners and, in particular, to a composite rivet made of filamentary material in a resin matrix.

BACKGROUND INFORMATION

There are numerous composite rivets available but most are presently designed for use with thermosetting resin matrix materials. Basically, a thermosetting resin is one that is heated to a specific temperature, usually above the melting point, wherein it undergoes a chemical change (cures) and strengthens. Since thermosetting resins will polymerize even at room temperatures, they must be stored at low temperatures. On the other hand, the strength of thermoplastic resins are inherent and they do not undergo a chemical change when heated. This characteristic coupled with the fact that many thermoplastics can function at temperatures above 500° F. make them ideal matrix material for composites.

Composite rivets utilizing thermosetting resin matrixes are installed and "upset" while in a soft, partially cured "B" stage condition, so that they can be deformed. The amount and duration of heat to be applied is a function of the particular "B" stage resin utilized. However, even in this "B" stage they must be kept at low temperature to prevent further curing over a period of time. For example, U.S. Pat. No. 4,478,543 "Blind Rivet" by Lyon discloses a rivet having a fully cured head and shear portion (shank) and a separate partially cured (B stage) head forming portion held together by a centrally disposed mandrel. The head forming portion is deformed after heating by tensioning the mandrel. Thereafter, the temperature of the head forming portion is raised to the curing temperature. Another example can be found in U.S. Pat. No. 4,478,544 "Composite Rivet" by Strand. This is a composite rivet wherein carbon fibers are encapsulated in a "B" stage resin matrix and are enveloped in a high tensile strength and low modulus tubular sheath. The sheath restricts the flow of the thermosetting resin during the cure cycle. The problem with the two rivets described above is that the use of a thermosetting resin matrix material provides only limited shelf life. A metal mandrel can cause corrosion problems especially if the filamentary material is graphite. Additionally, no effort is made to prevent breakage or damage of the filamentary material when the head forming portion of the rivet is upset.

U S. Pat. No. 4,687,396 "One-Piece Composite Rivet with Deformable Head Portion and Mandrel" by Berecz discloses a one-piece rivet wherein the head forming portion incorporates an integral mandrel extending therefrom. The head is formed by shearing away material from the mandrel and compressing it to form an "upset" head. U.S. Pat. No. 4,687,397 "Composite Rivet with Strippable Mandrel" by Berecz is similar except that a retaining ring is provided to limit the amount of deformation of the sheared off portion of the mandrel. In these two examples, the deteriorating effect of the shearing action on the filamentary material is questioned.

U.S. Pat. No. 4,687,398 "Composite Rivet with Collar Reinforced with Circumferential Fibers" by Berecz also discloses a rivet which uses an axially compressible radially expandable tubular preform with a mandrel extending therethrough. The mandrel incorporates an annular recess which extends from the end of the structures being joined and a locking collar is mounted thereabout. Upon compression of the head forming portion and tensioning of the mandrel, material is forced between the annular groove of the mandrel and the locking collar, with the locking collar limiting deformation. In U.S. Pat. No. 4,687,395 "Composite Rivet with Deformable Annular Collar Containing Randomly Chopped Fibers" by Berecz a similar concept is disclosed except the mandrel is integral and extends from the end of the preform. In this design, a locking collar is swaged into a recess that exists in the head forming portion of the mandrel. No locking collar is used. In these latter examples, no provision is made for removing the excess mandrel material. In addition, the rivet preforms have complex shapes and again no provision for preventing breakage of the filamentary material in the head forming portion is provided. Furthermore, these rivets require special installation tools.

Thus, it is a primary object of the subject invention to provide a composite rivet that can use a thermoplastic resin as the matrix material.

It is another primary object of the subject invention to provide a composite rivet which can be installed using only slightly modified existing installation tools.

It is further object of the subject invention to provide a composite rivet that provides controlled deformation of the filamentary material in the head forming portion thereof so that damage to the filamentary material is minimized.

It is a still further object of the subject invention to provide a composite rivet wherein the selected materials used in the manufacture thereof minimize the possibility of corrosion.

SUMMARY OF THE INVENTION

The invention is a composite rivet. In detail, the rivet comprises a tubular preform having a longitudinal axis and an aperture therethrough aligned with the longitudinal axis. The preform includes a head portion, a head forming portion and a shear portion therebetween. The filamentary material in the resin matrix is parallel to the longitudinal axis in the shear portion and is in a helical pattern at a helix angle of between 30 and 60 degrees about the longitudinal axis in the head forming portion. Ideally, the helix angle is between 40 and 50 degrees. A mandrel preferably made of a ceramic material is mounted in the aperture and extends outward from the head forming portion. Thus, when the rivet is installed, a tension force is applied to the mandrel and a compression force is applied to the head forming portion along with the application of heat. This causes the head forming portion to collapse in height and expand in diameter forming an "upset" head, locking the rivet in place upon cooling. With the filamentary material in a helical pattern the upset head is formed with little or no damage thereto. Preferably, the resin matrix material is a thermoplastic resin.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

Illustrated in FIG. 1 is a cross-sectional view of the composite rivet shown installed in a structure.

Illustrated in FIG. 2 is an enlarged partial view of FIG. 1 indicated by arrow 2, wherein the method of installation is illustrated.

Illustrated in FIG. 3 is a cross-sectional view of the rivet illustrated in FIG. 1 in the completely installed condition.

Illustrated in FIG. 4 is a cross-sectional view of a second embodiment of the composite rivet.

DETAILED DESCRIPTION OF THE PREFERRED EMBODIMENTS

Illustrated in FIG. 1 is a structure 10 consisting of a first sheet 12 having an upper surface 14 and a second sheet 16 having a bottom surface 18. The structure 10 includes a hole 20 therethrough having a countersunk end 22 contiguous with upper surface 14. Mounted in the hole 20 is a rivet preform 30 with a longitudinal axis, indicated by numeral 32. The preform 30 further comprises a head portion 34 having a top surface 35 and a conical underhead 36 for mating with countersunk end 22 of the hole 20. The preform 30 further includes a shear portion (shank) 38 and a head forming portion 40 which extends out of the bottom surface 18 and which includes an end surface 41. The preform 30, additionally, includes an aperture 42 therethrough having a countersunk end 44 contiguous with top surface 35 of the head portion 34.

The preform 30 is made of filamentary material 46 in a resin matrix 47. Preferably, the resin is a thermoplastic resin such as polyetheretherketone (PEEK); however, the resin could also be a thermosetting type. The filamentary material is substantially parallel to the longitudinal axis 32 in the shear portion 38 spreading angularly outward from the longitudinal axis 32 in the head portion 34 and at a helical angle 50 about the longitudinal axis 32 in the head forming portion 40. The angle 50 is between 30 and 60 degrees and preferably the angle is between 40 and 50 degrees. Mounted within the aperture 42 is a mandrel 60 having a head 62 with a conical underhead surface 64 adapted to mate with countersink 44 of the aperture 42. The mandrel 60 has an opposite end 66 extending beyond surface 41 of the head forming portion 40 of the preform 30. The mandrel 60 also incorporates a notch 68 making the portion 69 thereunder frangible; the location of which will be subsequently discussed.

Also illustrated is an installation tool 70, a slightly modified version of an existing rivet installation tool. The tool 70 includes a mandrel gripping chuck 74 and integral heating element 76 having a retaining cup 78 mounted thereon. The depth 80 and diameter 81 of the cup 78 determines the length and diameter of the "upset" head to be subsequently formed. The inner surface 82 of the cup 78 is coated with a parting agent, for example, a dry film lubricant.

Illustrated in FIG. 2 is an enlarged view of a portion of FIG. 1 indicated by arrow 2. The chuck 74 is shown gripping the mandrel 60 and pulling it downward and the cup 78 is pushing toward the structure 10. With the heating element 76 activated, the head forming portion 40 will be softened. As it is softened, the cup 78 collapses the portion 40 to the "upset" shape as shown and indicated by numeral 40'. Note again that the depth 80 and diameter 81 of the cup 78 determine the height and diameter of the now formed "upset" head 40'. After forming of the head 40, the heating element 76 is deactivated and the now formed head 40' cools and hardens quickly. Thereafter a continued tension load will cause the mandrel 60 to break at the notch 68. A small sideways "jerk" of the tool will also cause breakage. Thus, placement of the notch 68 should be at a point wherein it is just below the end of the "upset" head 40'. Note that the filamentary material in the head forming portion at the angle 50 offers minimal resistance to deformation in eliminating or greatly reducing breakage thereto. The completed rivet, now indicated by 30', is illustrated in FIG. 3.

Also of importance is the selection of the material for the mandrel 60. A typical metal mandrel would allow heat transfer into the shear portion 38 of the preform 30 where it could possibly soften it. Furthermore, metal would elongate lessening the preload. Thus, it has been determined that using a high strength ceramic material, such as a high temperature $Si_3N_4$ ceramic material manufactured by the Garrett Corporation, Los Angeles, Calif., prevents these problems from occurring. Furthermore, such a ceramic would reduce or eliminate corrosion problems that might occur should the filamentary material be made of graphite and the mandrel were made of metal.

Illustrated in FIG. 4 is a second embodiment of the composite rivet. As shown, the rivet preform, indicated by numeral 90, is a protruding head type having a head 92, a shear portion 94 and a head forming portion 96. The preform 90 is shown installed in a hole 98 in a structure 100 (comprising an upper sheet 102 and a bottom sheet 104). A mandrel 106 is deposed therein and is similar to mandrel 60 as illustrated in FIG. 1, except that the end 108 is threaded up to the notch 110. Thus, after the head forming portion 96 is heated with the mandrel 106 in tension, a threaded nut 114 mounted on the threaded end 108 and having a cup 116, similar to cup 78 shown in FIG. 1, is mounted thereto. The nut 114 is threaded up the mandrel until the cup bottoms, the position being indicated in dotted lines and by numeral 116', forming the upset end, indicated by numeral 96'.

The thermoplastic matrix rivet preforms would typically be manufactured by a pultrusion process with the head portion and the twisting of the filaments in the head forming portion normally accomplished after pultrusion and prior to cooling.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

I claim:
1. A composite rivet comprising:
   a tubular preform having a longitudinal axis and an aperture therethrough aligned with said longitudinal axis, a head portion, a head forming portion and a shear portion therebetween, said preform composed of filamentary material in a resin matrix with the filamentary material in said shear portion parallel to said longitudinal axis and the filamentary material in said head forming portion in a helical pattern about said longitudinal axis; and a mandrel mounted in said aperture, said mandrel having an end extending outward from said head forming portion.

2. The composite rivet as set forth in claim 1, wherein said filamentary material in said head forming portion is at a helix angle to said longitudinal axis of between 30 to 60 degrees.

3. The composite rivet as set forth in claim 2, wherein said helix angle is between 40 to 50 degrees.

4. The composite rivet as set forth in claim 3, wherein the end of said aperture in said head portion includes an enlarged portion and said mandrel includes a corresponding enlarged portion at its opposite end, such that said mandrel cannot pass through said aperture.

5. The composite rivet as set forth in claim 4, wherein said resin is a thermoplastic resin.

6. The composite rivet as set forth in claim 5, wherein said mandrel is made of a ceramic material.

* * * * *